United States Patent [19]

Frese et al.

[11] Patent Number: 4,700,738
[45] Date of Patent: Oct. 20, 1987

[54] LIQUID LEVEL CONTROLLER

[75] Inventors: John J. Frese, Katy; Quin D. Kroll, Houston, both of Tex.

[73] Assignee: Dover Resources, Inc., Tulsa, Okla.

[21] Appl. No.: 908,228

[22] Filed: Sep. 17, 1986

[51] Int. Cl.⁴ .............................................. F16K 31/18
[52] U.S. Cl. .................................... 137/412; 137/413; 137/85
[58] Field of Search ...................... 137/85, 86, 82, 412, 137/413, 414, 445

[56] References Cited

U.S. PATENT DOCUMENTS

| 2,616,440 | 11/1952 | Mason | 137/85 |
| 3,041,512 | 6/1962 | Zeigler | 137/412 X |
| 3,052,254 | 9/1962 | Parks | 137/414 X |

Primary Examiner—Alan Cohan
Attorney, Agent, or Firm—Vinson & Elkins

[57] ABSTRACT

An improved liquid level controller having a housing, a body connecting from the rear of the housing for connecting directly to a vessel and to allow transmission of forces exerted by the displacer type float within the vessel responsive to changes in the level of liquid therein through the housing to a shaft having rotation about an axis extending horizontally and parallel to the rear of the housing, a torque bar pivotally mounted near its center to the body, means for imparting the rotational force of said shaft as an upward force to one side of the torque bar, means biasing the torque bar in a direction to maintain it in contact with and balance the force from said force imparting means, a control means having a supply and an output for actuating a liquid control, a proportional band mechanism including a lever pivotally mounted to said housing at one end and having a fulcrum member slidably mounted thereon for engaging said torque bar to transmit the slight motion of said torque bar in balancing the forces to a pin engaging said control means to control the liquid level in the vessel.

8 Claims, 9 Drawing Figures 4,700,738

LIQUID LEVEL CONTROLLER

BACKGROUND

The present invention relates to an improved liquid level controller. The control of liquid levels in vessels has long been accomplished through use of a float whose motion or buoyancy force is transmitted to a pneumatic or electric controller which is connected to a valve for opening and closing flow of liquid from the vessel. Examples of an early non-bleeding pneumatic controller of this type are shown in the A. S. Parks, U.S. Pat. Nos. 2,649,771; 3,052,254; 3,064,474; 3,120,241 and 3,128,784.

The C. E. Mason, U.S. Pat. No. 2,616,440 discloses a pneumatic liquid level controller which utilizes an arm connecting a float within the vessel to a torque tube which is secured to the back of the controller housing and to the controller mechanism. This patent illustrates a motion balance, constant bleed type of pilot. Another patent which also discloses a motion balance and constant bleed type of pilot is the A. J. Hanssen, U.S. Pat. No. 3,088,485. Both of theses units require right or left hand mounting when used as a liquid level controller. All of these devices include a means to vary sensitivity (proportional band).

The G. Ho. U.S Pat. No. 4,543,973 discloses a liquid level controller having a front pilot mounting but utilizes motion balancing and constant bleed type of pneumatic pilot nozzle. A similar device is didclosed in the C. Glasgow et al, U.S. Pat. No. 4,542,765. Liquid Level Lectronics, Inc. (LLC, Inc.) has marketed a front pilot mounting liquid level controlling but such device does not provide for a variable proportional band mechanism. The Ho, Glasgow et al and LLC, Inc. devices all have non-adjustable fixed proportional bands.

Most of the prior art liquid level controllers have included the right or the left hand mounting which requires that both mountings be available in inventory since their conversion between such mountings necessitates extensive reworking of the housing, the mounting and the components.

SUMMARY

The improved liqiud controller of the present invention inlucdes a housing, a body connecting from the rear of the housing directly to a vessel and to allow transmission of the forces exerted by a displacer type float within the vessel responsive to changes in the level of liquid therein through the body to a shaft having rotation about an axis extending horizontally and parallel to the rear of the housing, a torque bar pivotally mounted near its center to the housing, means for imparting the rotational force of said shaft as an upward force to one side of the torque bar, means biasing the torque bar in a direction to maintain it in contact with and balance the force from said force imparting means, a control means having a supply and an output for actuating a liquid control, a proportional band, means for adjusting the proportional band including a lever pivotally mounted to said housing at one end parallel to the torque and having fulcrum member slidably mounted thereon for engaging said torque bar to transmit the slight motion of said torque bar in balancing the forces to a pin engaging said control means whereby movement of said lever actuates said control means to control the liquid level in the vessel.

As used herein the term "proportional band" is intended to be defined by the number of inches of level change necessary to stroke a control valve. The ratio of proportional band to displacer length is referred to as percent proportional band. Thus, if six inches of level change will cause the control valve to move from open to close, or from close to open and the displacer is twelve inches long, the level controller is said to have a 50% proportional band.

An object of the present invention is to provide a variable proportional band mechanism for a universal front pilot mounting which does not require either right or left hand mounting.

Another object is to provide an improved liquide level controller having greater stability with a center of gravity close to the vessel and being sufficiently compact and close coupled to the vessel to avoid susceptibility to vibrations.

A further object is to provide an improved liquid level controller which can easily and quickly be converted between direct and reverse action and having a full range of sensitivity adjustment of the proportional band in both settings.

Still another object is to provide an improved liquid level controller which has front mounting and utilizes a force balance system and a non-bleed pilot.

A still further object is to provide an improved liquid level controller which is readily adaptable to receive displacers of various sizes and arm lengths.

BRIEF DESCRIPTION OF THE DRAWINGS

These and other objects and advantages are hereinafter set forth and explained with reference to the drawings wherein.

DESCRIPTION OF THE PREFERRED EMBODIMENTS

Figure 1:
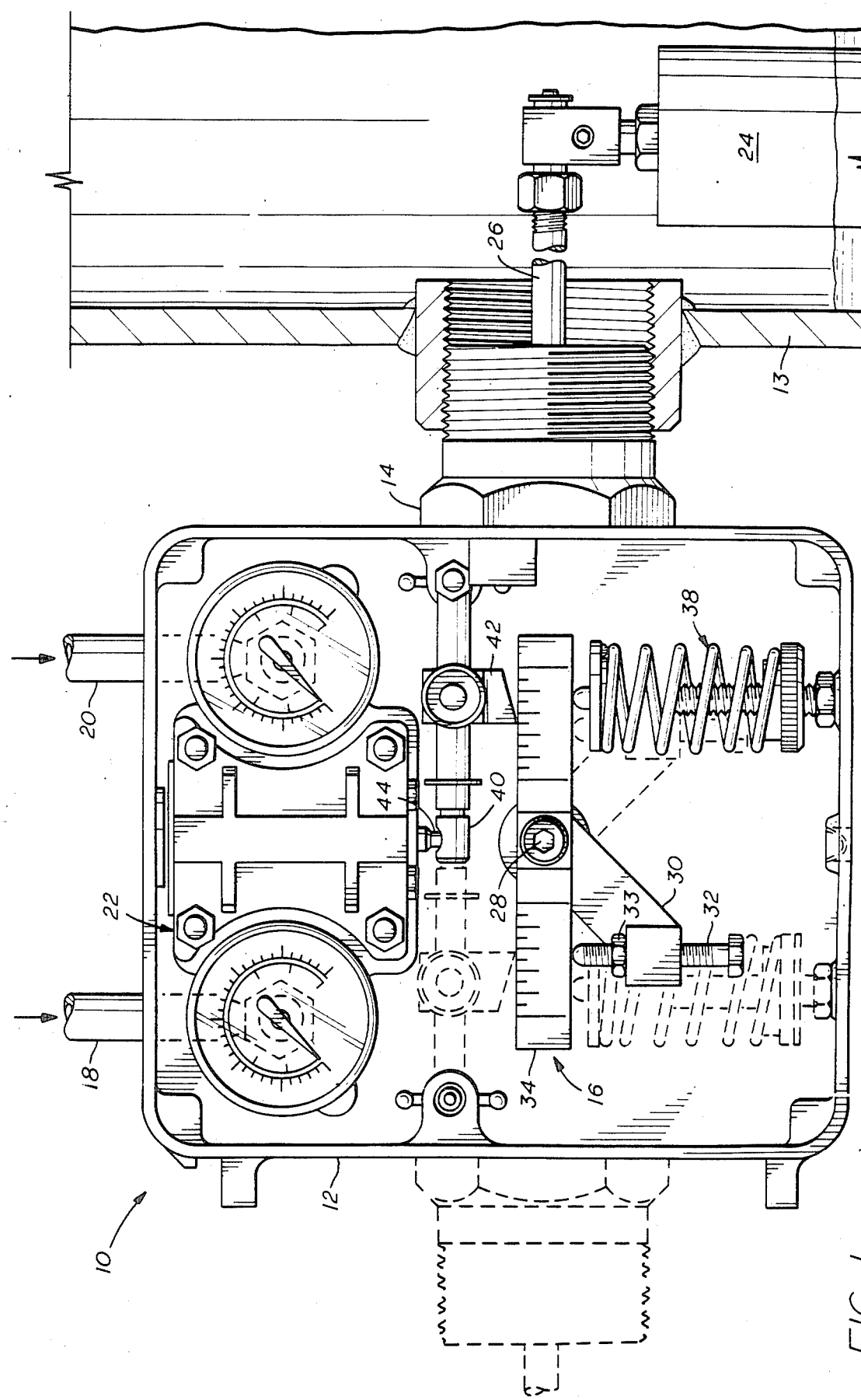
FIG. 1 is a front elevation view of a liquid level controller of the prior art showing the right hand mounting in solid lines and the left mounting in dashed lines.

Controller 10 illustrated in FIG. 1 is typical of the liquid level controllers of the prior art. Controller 10 includes housing 12, tubular connector body 14 which extends between housing 12 and vessel 13, proportional band mechanism 15 including force transmission means 16, instrument air supply 18, instrument air output 20 and pneumatic pilot assembly 22 controlling the instrument air flowing therethrough. Body 14 shown in solid lines is a right-hand mounting (left-hand mounting being shown in dashed lines) with the float or displacer 24 being connected through mounting 14 by arm 26 which is secured to shaft 28 that extends through the rear of housing 12. Level adjusting arm 30 is clamped to shaft 28 and has the upper end of screw 32 engaging the underside near one end of torque bar 34. Nut 33 is threaded on screw 32 above arm 30 to lock it in position when it has been properly set as hereinafter explained. Torque bar 34 is pivotally mounted on shaft 28 about its approximate midpoint with adjustable biasing means 38 engaging the underside of torque bar 34 near the end opposite to the end engaged by screw 32. Lever 40 is pivotally mounted to the side of housing 12 and includes flucrum member 42 slidably mounted thereon and in engagement with the upper surface of torque bar 34. The other end of lever 40 engages pilot pin 44 which extends into pneumatic pilot assembly 22 to control the flow of instrument air into and from output 20 and thus controls the valve (not shown) which opens and closes flow of liquid from the vessel 13 whose liquid level is to be controlled. After these elements are assembled in housing 12 with displacer 24 in its desired position, adjustable biasing means 38 is adjusted so that the control point occurs when displacer arm 26 is positioned in the center of connector body 14 and screw 32 is adjusted to adjust the level at which the liquid in vessel 13 is to be maintained. Thus, adjustable biasing means 38 balances the weight of displacer 24 which screw 32 adjusts the liquid level to be maintained.

Controller 10 can be right or left-hand mounted but level adjusting arm 30 must be re-oriented so that screw 32 engages the opposite end of torque bar 34. Also, adjustable biasing means 38 is moved to the opposite end of torque bar 34 and lever 40 is pivotally mounted to the opposite side of housing 12 (all as shown in dashed lines). Lever 40 is reveresed in its mounting to provide either direct acting or reverse acting controls. As shown in FIG. 1 the unit is reverse acting. The major change between right and lefthand mounting is in tubular connector body 14 which extends between vessel 13 and housing 12. These types of mountings were not universal mountings in the liquid level controllers of the prior art.

Figure 2:
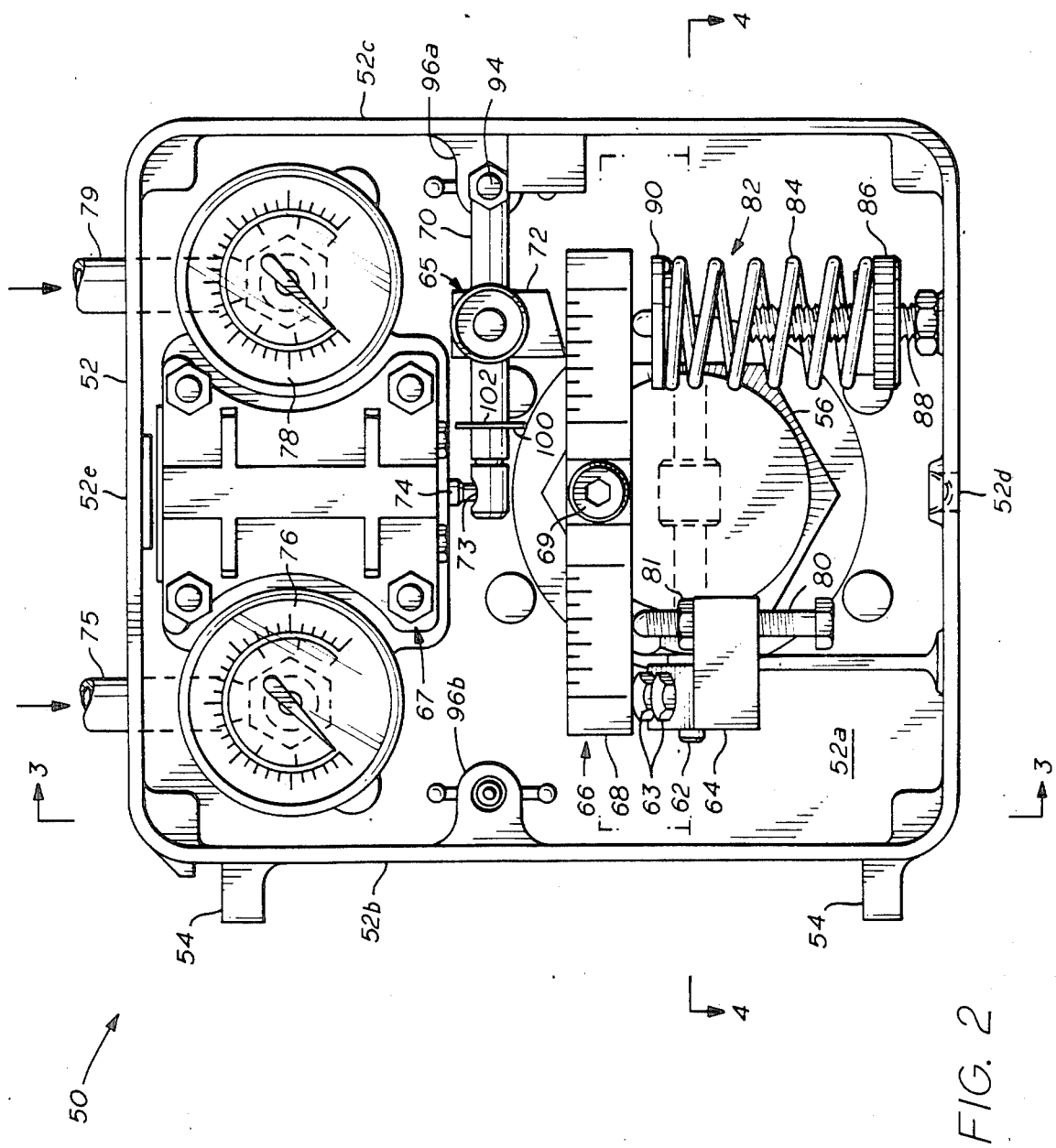
FIG. 2 is a similar front elevation view of the improved liquid level controller of the present invention.
Figure 3:
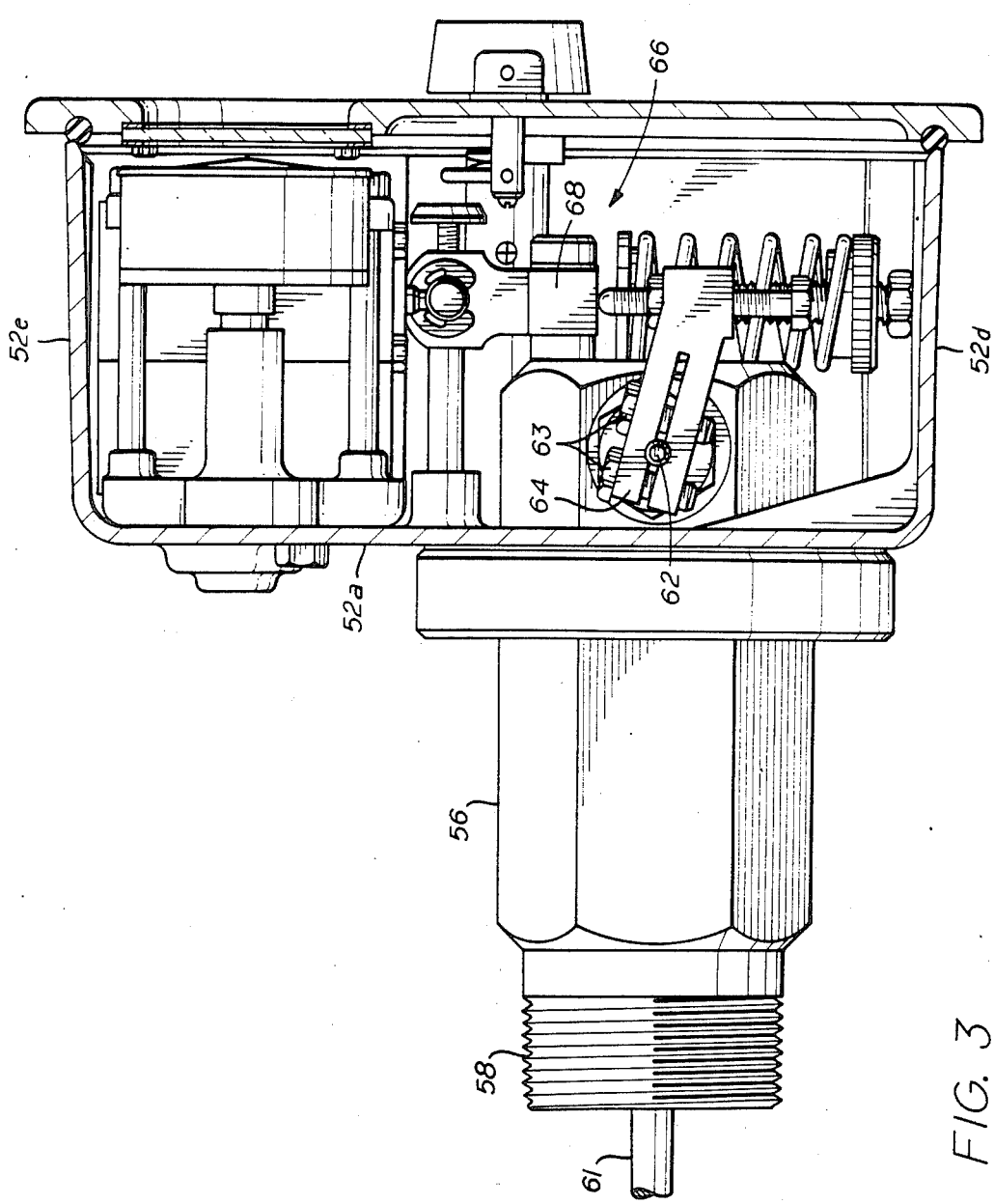
FIG. 3 is a sectional view taken along line 3—3 in FIG. 2.
Figure 4:
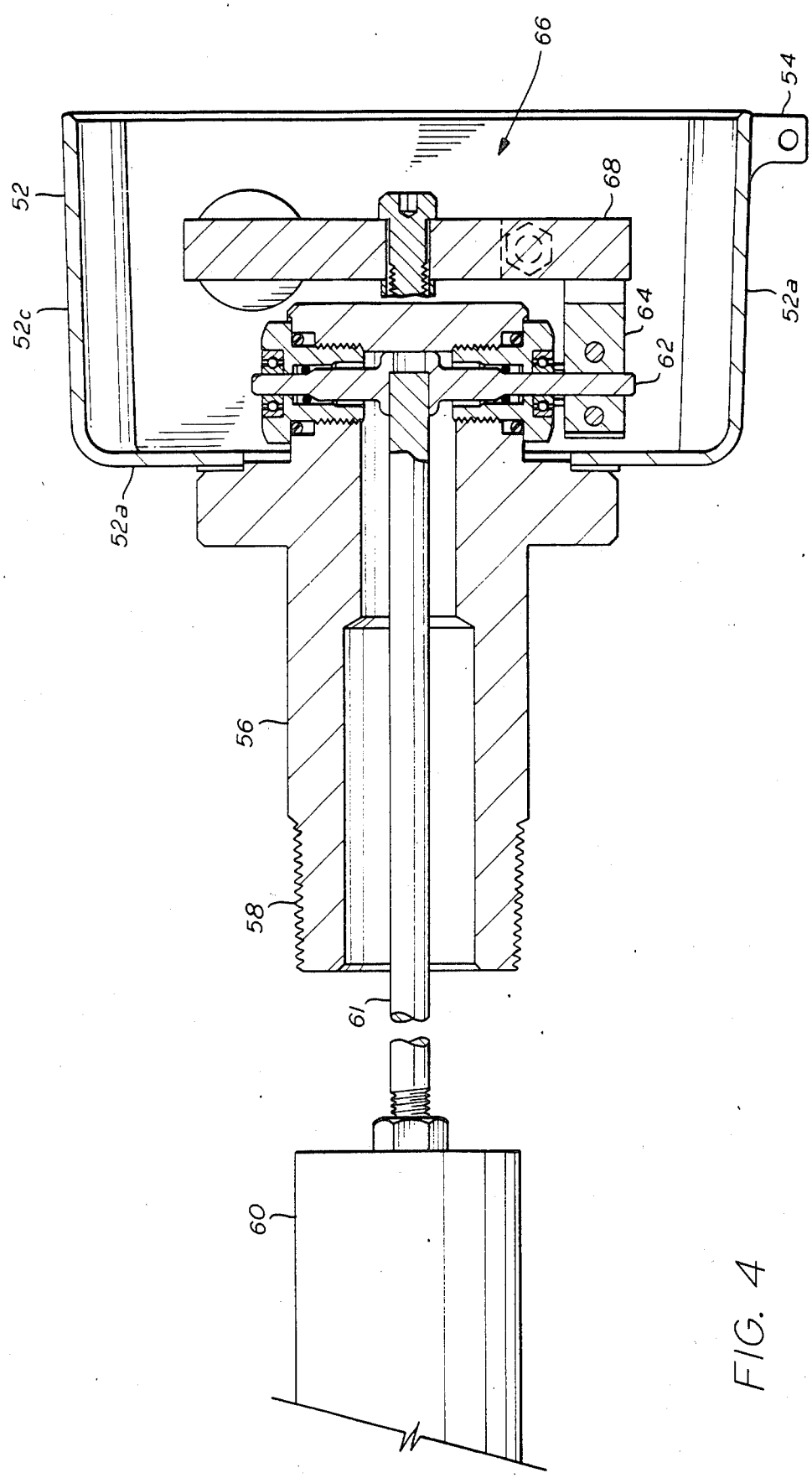
FIG. 4 is a sectional view taken along line 4—4 in FIG. 3.

Liquid level controller 50 shown in FIGS. 2, 3 and 4 is the preferred form of the improved controller of the present invention. Controller 50 includes housing 52 having back 52a, with sides 52b and c, bottom 52d and top 52e, with suitable means 54 on side 52b for attaching a cover (not shown) thereto. Body 56 is generally tubular and connects at right angles to the central portion of back 52a and its other end is threaded at 58 for connection into the vessel (not shown) whose liquid level is to be controlled. Float or displacer 60 is positioned with the vessel (not shown) and arm 61 connects from displacer 60 through body 56 to shaft 62 which is journaled in housing 52. Shaft 62 extends across the inner end of body 56 and extends therethrough into housing 52 with a sufficient portion of the end of shaft 62 for engagement by level adjusting arm 64. Screws 63 secure arm 64 to shaft 62.

Force transmission means 66 provides the connection between shaft 62 and pneumatic pilot assembly 67 and includes proportional band mechanism 65, level adjusting arm 64, torque bar 68 pivotally mounted to body 56 by mounting pin 69, lever 70 with flucrum member 72 slidably mounted thereon and secured by locking screw 71 and pilot pin 74 extending into pneumatic pilot assembly 67. Instrument air is delivered through line 75 to the rear of housing behind supply gage 76 for communication to pneumatic pilot assembly 67 and the output from pilot assembly 67 is discharged from the rear of housing behind output gage 78 through line 79 to control the valve (not shown) which opens or closes the discharge flow of liquid from within the vessel (not shown) whose liquid level is to be controlled.

Force transmission means 66 delivers the force tending to rotate shaft 62 through arm 64 to torque bar 68 by the engagement of adjustable screw 80 with the lower surface of one end of torque bar 68. Lock nut 81 secures screw 80 in its set position. Force balancing is achieved by adjustable biasing means 82 which has its base on the inside of bottom 52d and includes spring 84 which bottoms on adjustable washer 86 which is threaded on bolt 88 and urges bumper 90 against the lower surface of torque bar 68 at a position near the end opposite to the end engaged by screw 80. As previously explained with respect to controller 10, adjusting screw 80 adjusts the liquid leve to be maintained and adjustable biasing means 82 adjusts the balancing of the weight of the displacer 60. Lever 70 is pivotally mounted to housing 52 by pin 94 to hub 96a on the right side of housing 52 or hub 96b on the left side of housing 52. Fulcrum member 72 is slidably mounted on lever 70 between pin 94 and snap ring 100 which is positioned in groove 102 a short distance from the free end of lever 70. Pilot pint 74 engages in recess 75 of lever 70 substantially at its free end and extends into pilot valving assembly 67. Pilot pin 74 causes the valving within assembly 67 to operate in the known manner as hereinafter explained to cause pressure fluid or instrument air to be delivered through the output to the valve or to be vented from such valve.

Figure 6:
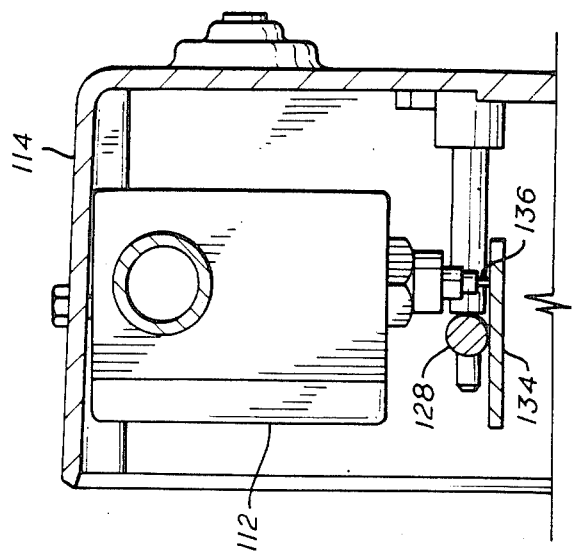
FIG. 6 is a typical sectional view of the lever, and operating pin of the control means shown in FIG. 5 and taken along line 6—6 therein.
Figure 5:
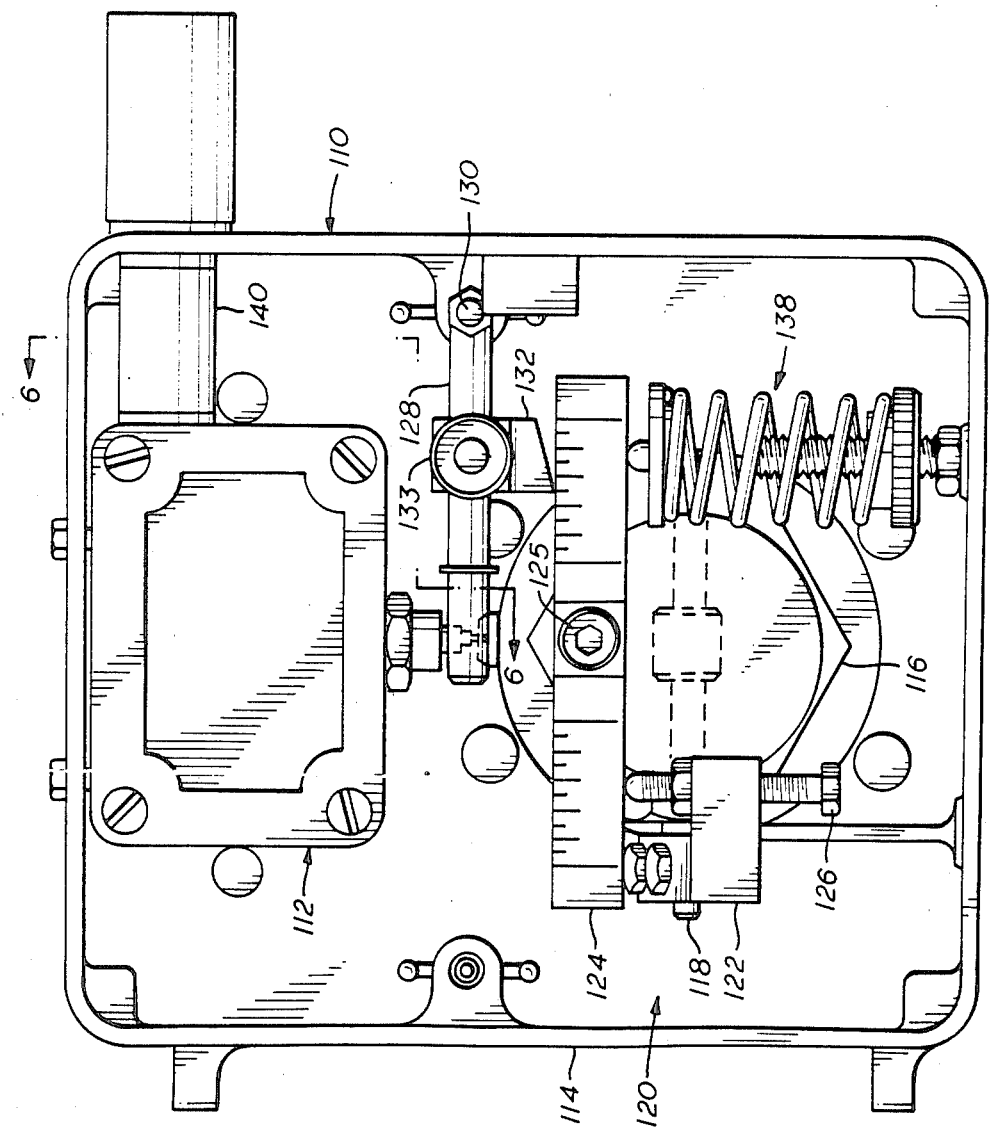
FIG. 5 is a front elevation view of a modified form of liquid level controller of the present invention with alternate control means.

The modified form of liquid level controller shown in FIGS. 5 and 6 are substantially similar to controller 50 previously described except that controller 110 does not include a pneumatic pilot assembly such as assembly 67 but rather includes either electrical or optical fiber means 112 for controlling the valve opening or closing the discharge from the vessel in which the liquid level is to be controlled.

Controller 110 includes housing 114 with tubular connector body 116 for connecting to the vessel (now shown), shaft 118 which extends through body 116 and is journaled in housing 114 for receiving the buoyant forces of the displacer (not shown), force transmitting means 120 and valving or switching means 112. Force transmission means 120 includes level adjusting arm 122 which is clamped to the end of shaft 118 which protrudes into the interior of housing 114, torque bar 124 which is pivotally mounted to body 116 by pin 125 and is engaged by screw 126 in the end of arm 122, lever 128 which is pivotally mounted by pin 130 to housing 114 and includes fulcrum member 132 slidably mounted thereon. Fulcrum member 132 is secured in its desired position on lever 128 by locking screw 133. The outer end of lever 128 includes plate 134 secured thereto and engaging pin 136 which extends into switching means 112 for operating a microswitch when means 112 is an electrical circuit means and an optical interrupt or switch means when means 112 is a fiber optic circuit means. It should be noted that plate 134 should be in contact with pin 136 or pin 136 should be biased in the direction toward plate 134 so that it is maintained in such contact position. Also, plate 134 is sufficiently long to ensure that it comes into engagement with pin 136 independent of the mounting position of lever 128. Adjustable biasing means 138 is provided in engagement with torque bar 124 and to assist in the balancing of the forces transmitted thereto by shaft 118. Fitting 140 extends into housing and into switching means 112 to accommodate wiring or optical fibers which connect into and extend from assembly 112.

Figure 8:
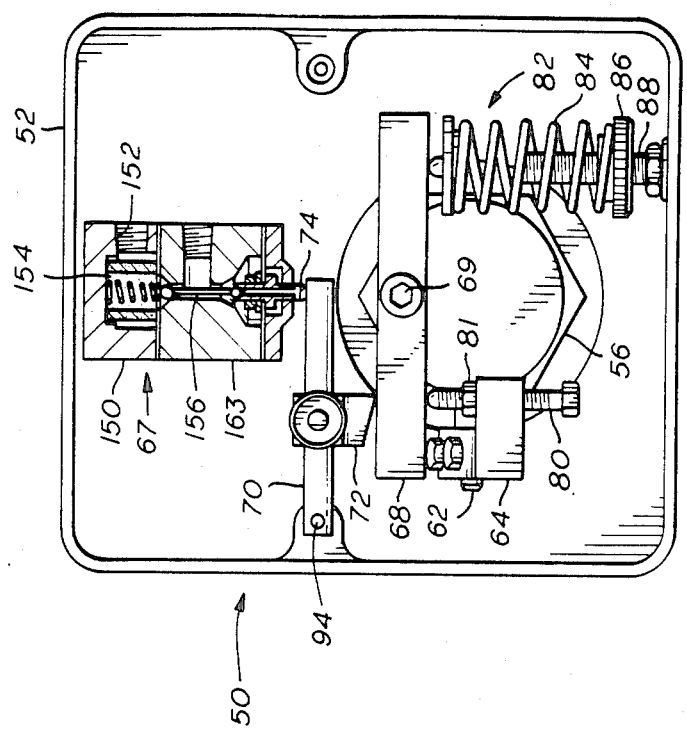
FIG. 8 is another schematic view of the controller and pilot to explain the reverse acting setting of the controller.
Figure 7:
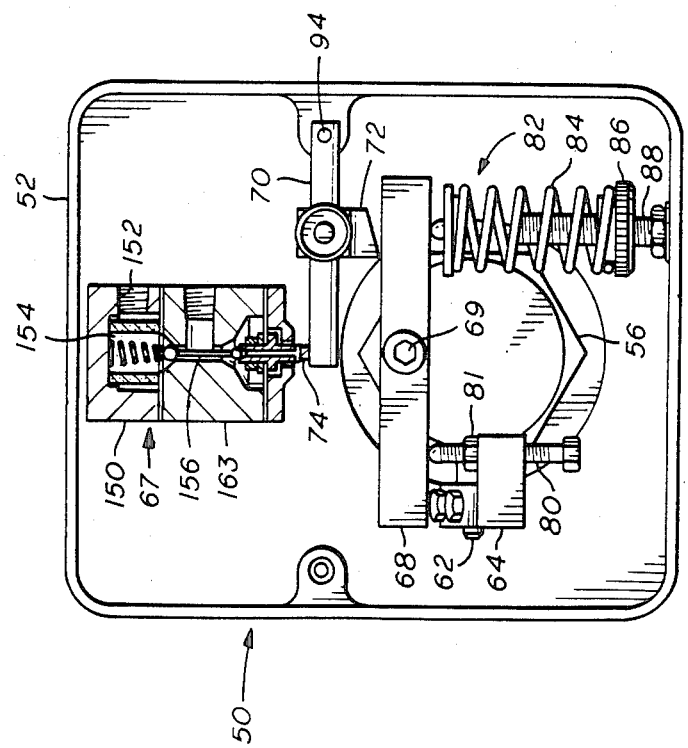
FIG. 7 is a schematic view of the controller and pneumatic pilot to explain the direct acting setting of the controller.
Figure 9:
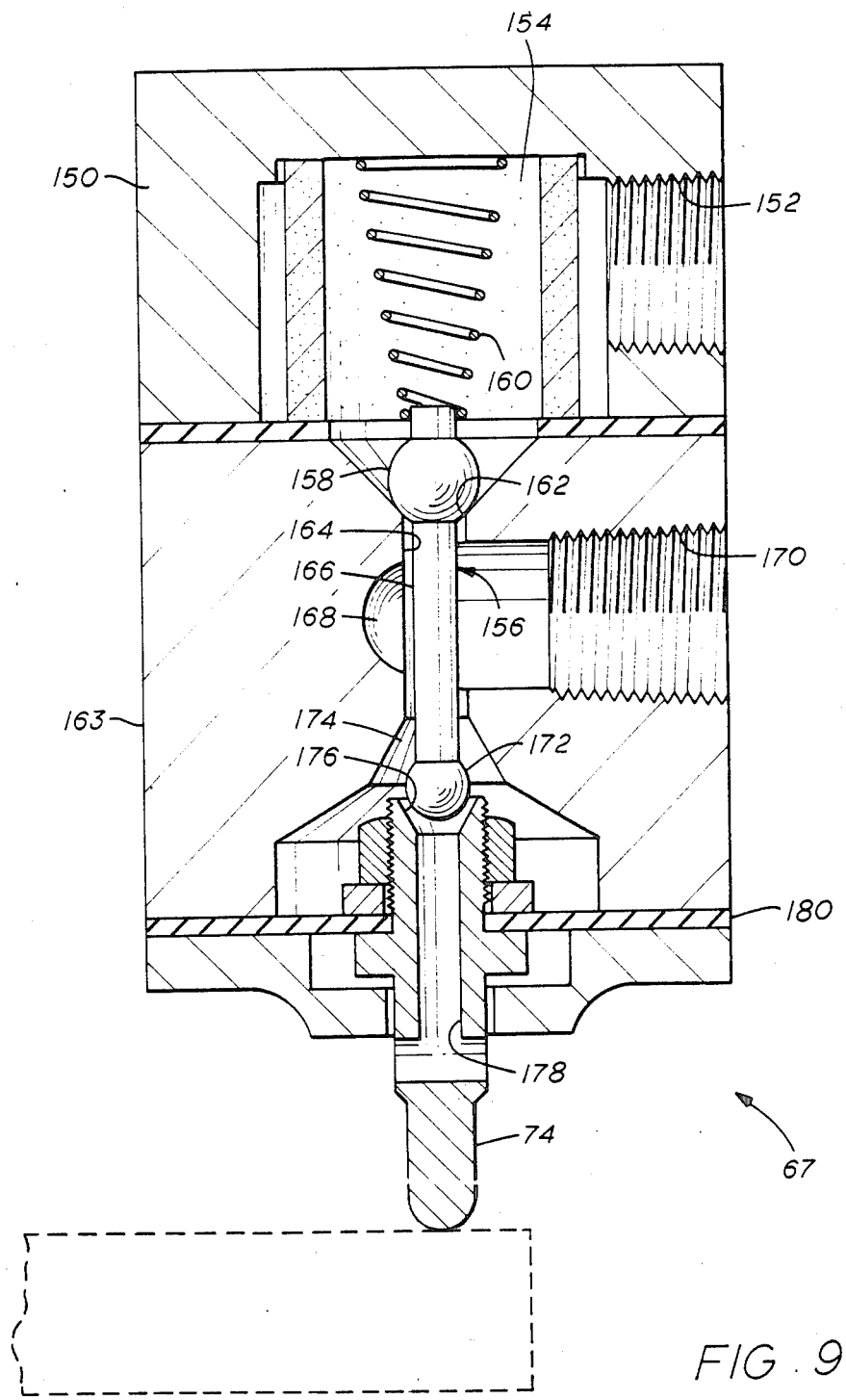
FIG. 9 is an enlarged sectional view of the pneumatic pilot assembly shown in FIG. 7 to more clearly show the components of such assembly.

Controller 50 is shown schematically in FIGS. 7 and 8. FIG. 7 depicts the arrangement thereof for the controller 50 to function as a direct acting pilot. FIG. 8 depicts the arrangement of the controller of the controller 50 to function as a reverse acting pilot. In both figures the pilot assembly illustrated is a pneumatic throttling pilot arrangement. The details of the pilot assembly 67 are shown in FIG. 9, the position thereof being the same as shown in FIG. 3.

In FIG. 7 the controller 50 is set so that with a rising level of liquid in the vessel being controlled the output of instrument air from pilot assembly 67 increases. This increase of instrument air output causes the liquid discharge valve to open so that the level of liquid in the vessel being controlled will ower and stabilize at the desired liquid level. As shown in FIG. 9 Pilot assembly 67 includes upper body 150 having supply port 152 extending into the upper chamber 154 and peanut valving member 156 has its upper ball 158 biased by spring 160 toward seat 162 in center body 163 which surrounds the annular passage 164 around shaft 166 of peanut valving member 156. Passage 164 extends through center body chamber 168. Port 170 extends into chamber 168 connecting with passage 164 and is the output port for delivering instrument air pressure to the liquid lever control valve (not shown). Ball 152 on the opposite end of peanut valving member 156 is positioned in lower chamber 174 and is adapted to engage the upper seating end 176 of pilot pin 74 surrounding passage 178 which extends through pilot pin 74. Pilot pin 74 is supported on diaphragm 180 for movement responsive to the differential pressure on opposite sides of the diaphragm 180. From a viewing of FIG. 7 it can be seen that as the float rises (liquid level rising) shaft 62 is rotated forward so that arm 64 moves screw 80 downwardly which releases spring biasing force causing an upward thrust and exerts a force upwardly on fulcrum member 72, lever 70 and pilot pin 74. This slight movement will cause lower ball 172 to engage sear 176 blocking flow therethrough which would vent air from center body chamber 168 and also lifts upper ball 158 above seat 162 allowing flow of air (supply) under pressure from upper chamber 154 into center body chamber 168 and out port 170 for operation of the liquid level control valve (not shown).

Movement of fulcrum member 72 changes the relative lever arms of torque bar 68 and lever 70 to provide an adjustment of the sensitivity of the controller. For example, the movement of fulcrum member 72 on lever 70 in the direction toward pin 94, as shown in FIG. 2, decreases the control sensitivity. This means that there is less pressure of pilot output per inch of change in liquid level. The movement of fulcrum member 72 on lever 70 in the direction away from pin 94 provides an increase in control sensitivity. This means that there is more pressure of pilot output per inch of change in liquid level.

In FIG. 8 controller 50 is set so that with a rising level in the vessel being controlled the output of pilot valving assembly 67 decreases. From a viewing of FIG. 8 it can be seen that as the float rises (liquid level rising) shaft 62 is rotated so that arm 64 moves screw 80 downwardly which causes force balancing and releases the force exerted on fulcrum member 72 allowing lever 70 and pilot pin 74 to move slightly downwardly. This downward movement causes peanut valving member 156 to move downwardly so that its upper ball 158 engages seat 162 blocking the flow of air (supply) from upper chamber 154 into center body chamber 168 and lower ball 172 disengages from seat 176 to allow a venting of air (output) from center body chamber 168 and from the liquid level control valve through output port 170 through passage 178 in pilot pin 74. As mentioned above, the movement of fulcrum member 72 changes the relative lever arms of torque bar 68 and lever 70 to provide an adjustmnet of the sensitivity of the controller.

What is claimed is:

1. A liquid level controller, comprising
    a housing having a rear wall, side walls surrounding the rear wall and a cover connected to the side walls,
    a shaft rotationally within said housing in a position parallel to the rear wall of said housing,
    a lever pivotally mounted to said housing,
    a torque bar pivotally mounted about its approximate mid point,
    a liquid displacement member for sensing the liquid level to be controlled,
    an arm extending through the rear of said the housing to said liquid displacement member for transmitting vertical forces responsive to changes in liquid level as a force tending to rotate said shaft,
    means for transmitting force exerted on said shaft to a force on said torque bar about its pivotal mounting,
    means interconnecting said torque bar and said lever for transmitting forces to said lever,
    means biasing said bar to balance force exerted thereon by the weight of the liquid displacement member,
    a valving assembly,
    means engaging between said lever and said valving assembly to provide an output for controlling liquid level, and
    means for varying the sensitivity of means providing the output for controlling liquid level.

2. A liquid level controller according to claim 1 wherein said sensitivity varying means includes
    a fulcrum member movably positioned between said lever and said torque bar.

3. A liquid level controller according to claim 1 wherein said valving assembly is a pneumatic pilot and including
    means supplying a pressure fluid to said pneumatic pilot, and
    means for conductor a pressure fluid from said pneumatic pilot as a control media for controlling liquid level.

4. A liquid level controller according to claim 1 wherein said valving assembly is an electrical control circuit and including
    switching means providing an electrical output to control liquid level.

5. A liquid level controller according to claim 1 wherein said valving assembly is an optical fiber control circuit and including
    switching means providing an electrical output to control liquid level.

6. A liquid level controller for controlling the level of liquid in a container, comprising a housing having a back wall, side walls, a top wall, a bottom wall and a cover for engaging the outer edges of said walls, means for connecting through and perpendicular to the back wall of said housing into the liquid vessel, means for sensing the level of liquid in the vessel, an arm connected to said liquid level sensing means and extending through said connecting means, a shaft pivotally supported transversely in said connecting means perpendicular to and engaged by said arm for rotation responsive to change of liquid level in said vessel, one end of said shaft extending through said connecting means into said housing, torque bar pivotally mounted within said housing at a point near the center of said bar, means transmitting the force from said shaft to one end of said bar, means biasing the other end of said bar in a direction to maintain engagement with said force transmitting means and to balance forces on said bar, a proportional band mechanism including a lever pivotally mounted to said housing, a fulcrum member slidably mounted on said lever and engaging bar, means for securing said fulcrum member in selected positions on said lever, a supply of control medium to said housing, an output of control medium from said housing, means for connecting and interrupting flow of control medium from said supply to said output, and means engaged by said lever to actuate said flow connecting and interrupting means.

7. A liqiud level controller comprising a housing, a shaft rotationally mounted within said housing, a connection in the rear of the housing and perpendicular thereto for connecting to a vessel containing liquid whose level is to be controlled and to allow transmission of the forces exerted responsive to changes in the level of liquid through the connection to said shaft which has its rotation about an axis extending horizontally and parallel to the rear of the housing, a torque bar pivotally mounted to the housing, means for imparting the rotational force of said shaft as a force on one side of said torque bar, means biasing the torque bar in a direction to maintain it in contact with and balance the force from said force imparting means, a control means having a supply and an output for actuating a liquid control, a pin engaging said control means for acutation thereof, and a lever pivotally mounted to said housing at one end and having a fulcrum member slidably mounted thereon for engaging said torque bar to transmit the slight motion of said torque bar in balancing the forces to said pin engaging said control means whereby movement of said lever actuates said control means.

8. A liquid level controller according to claim 1 including a tubular member extending perperdicularly through the rear wall of said housing in a substantially straight line to the location of the liquid whose level is to be controlled in surrounding relation to said arm, means closing the inner end of said tubular member, saud shaft extending through said tubular member and being exposed therein for connection to said arm, said shaft also having at least one end exposed within said housing for connection to the means transmitting force to said torque bar.

* * * * *

UNITED STATES PATENT AND TRADEMARK OFFICE
CERTIFICATE OF CORRECTION

PATENT NO. : 4,700,738

DATED : October 20, 1987

INVENTOR(S) : John J. Frese and Quin D. Kroll

It is certified that error appears in the above—identified patent and that said Letters Patent is hereby corrected as shown below:

Page 1 of 2

Column 1, line 23, delete "theses" and insert "these".

Column 1, line 30, delete "didclosed" and insert "disclosed".

Column 1, line 46, delete "liqiud" and insert "liquid".

Column 1, line 47, delete "inlucdes" and insert "includes".

Column 2, line 14, delete "liquide" and insert "liquid".

Column 3, line 16, delete "flucrum" and insert "fulcrum".

Column 3, line 38, delete "reveresed" and insert "reversed".

Column 3, line 67, delete "flucrum" and insert "fulcrum".

Column 4, line 22, delete "leve" and insert "level".

Column 4, line 29, delete "pint" and insert "pin".

Column 5, line 22, delete "ower" and insert "lower".

Column 5, line 46, delete "sear" and insert "seat".

Column 6, line 15, delete "adjustmnet" and insert "adjustment".

Column 6, line 56, delete "conductor" and insert "conducting".

Column 7, line 37, delete "liqiud" and insert "liquid".

Column 8, line 17, delete "acutation" and insert "actuation".

UNITED STATES PATENT AND TRADEMARK OFFICE
CERTIFICATE OF CORRECTION

PATENT NO. : 4,700,738

DATED : October 20, 1987

INVENTOR(S) : John J. Frese and Quin D. Kroll

It is certified that error appears in the above-identified patent and that said Letters Patent is hereby corrected as shown below:

Column 8, line 34, delete "saud" and insert "said".

Signed and Sealed this

Twenty-sixth Day of April, 1988

Attest:

DONALD J. QUIGG

*Attesting Officer*  *Commissioner of Patents and Trademarks*